United States Patent

Saund

[11] Patent Number: 5,835,241
[45] Date of Patent: Nov. 10, 1998

[54] METHOD FOR DETERMINING THE PROFILE OF A BOUND DOCUMENT WITH STRUCTURED LIGHT

[75] Inventor: Eric Saund, San Carlos, Calif.

[73] Assignee: Xerox Corporation, Stamford, Conn.

[21] Appl. No.: 655,520

[22] Filed: May 30, 1996

[51] Int. Cl.⁶ .................................................. H04N 1/387
[52] U.S. Cl. ......................... 358/488; 358/296; 358/493; 358/466
[58] Field of Search ..................................... 358/493, 488, 358/296, 474, 466, 445–446, 443; 355/25; 382/318–319, 203–204

[56] References Cited

U.S. PATENT DOCUMENTS

| | | | |
|---|---|---|---|
| 4,980,720 | 12/1990 | Siegel | 355/233 |
| 5,084,611 | 1/1992 | Okisu et al. | 250/208.1 |
| 5,119,206 | 6/1992 | Rourke et al. | 358/296 |
| 5,276,530 | 1/1994 | Siegel | 358/406 |
| 5,359,207 | 10/1994 | Turner | 257/81 |
| 5,377,019 | 12/1994 | Okisu et al. | 358/464 |
| 5,416,609 | 5/1995 | Matsuda et al. | 358/474 |
| 5,497,236 | 3/1996 | Wolff et al. | 358/296 |

FOREIGN PATENT DOCUMENTS 35 46 404 A1  7/1993  Germany ........................ G02B 27/02

OTHER PUBLICATIONS

Ballard, D.H., Brown, C.M., "Imaging Device for Computer Vision," Computer Vision, Published by Prentice–Hall, Inc., Englewood Cliffs, NJ, pp. 52–56.

Strat, T.M., "Recovering the Camera Parameters from a Transformation Matrix," Readings in Computer Vision: Issues, Problems, Principles, and Paradigms, Morgan Kaufmann Publishers, Inc., Los Altos, CA., pp. 93–100.

Primary Examiner—David K. Moore
Assistant Examiner—Stephen Brinich

[57] ABSTRACT

An overhead scanning system records pages from bound documents in an upright and open condition. A light stripe is projected onto each page of the bound document to measure the non-planar deformations of each page. The scanning system records a first image with the light stripe and a second image without the light stripe. After identifying a set of pixels representing the light stripe in the first image, the set of pixels is smoothed to minimize large transitions between scan lines. Subsequently, a crease is identified in the set of pixels that represents the spine of the bound document. The pixels forming the crease are replaced with pixels that are defined using a parametric model that approximates the spine region of a bound document. This substitution insures that the spine region of a bound document is accurately depicted before determining a page shape transform with the identified set of pixels representing defining the projected light stripe. An image correction system de-warps the second image using the page shape transform and a perspective transform to correct distortion due to the pages of the bound document being curved relative to the support plane of the system. The de-warped image is determined by "polling" location in the second image for output values.

28 Claims, 13 Drawing Sheets

METHOD FOR DETERMINING THE PROFILE OF A BOUND DOCUMENT WITH STRUCTURED LIGHT

The present invention relates generally to a system for scanning bound documents, and more particularly to a method for determining the height profile of a bound document positioned in an open and face-up condition.

BACKGROUND OF THE INVENTION

Book scanners are becoming more prevalent given the advent of inexpensive digital storage and the ease with which digital information can be disseminated and reproduced. Recording bound documents in a digital format has become an important manner in which to preserve information in ancient books, periodicals, manuscripts, or any other document having a bound edge with a hard or soft cover. Institutions such as the Library of Congress, the Vatican library, and university libraries seek to scan large numbers of volumes of books, both to create digital libraries capable of feeding the information superhighway and to halt the rapid decay of information stored in older printed works. Once the content of a page of a bound document is scanned and electronically recorded, the recorded digital image can then be manipulated or processed to enhanced forms not originally available in its bound format. For example, digital images recorded on a storage medium can be reproduced audibly using applications that generate speech from ASCII text. Alternatively, bound documents digitally recorded can be reformatted and supplemented with additional information and reproduced on demand as hardcopy using an electronic printing machine or the like.

Different arrangements exist for scanning bound documents. Most arrangements are traditional flat-bed platen scanners that scan bound documents in a face-down position. A disadvantage of flat-bed scanning arrangements is that they require the application of a force to the spine region of a bound document to insure that the bound document comes within a scanner's depth of focus. Besides damaging the spine region of a bound document, the scanning process is tedious and time-consuming because the bound document must be repositioned after scanning each page. In addition, image quality is often poor due to loss of focus, uneven illumination, and distortion caused by curvature of a page in the vicinity of the binding. U.S. Pat. Nos. 4,980,720 and 5,276,530 to Siegel disclose an improved arrangement that minimizes the application of force to the spine region of a bound document and improves the image quality of scanned images. Specifically, Siegel discloses a flat-bed scanner with a book mode that minimizes the force typically applied to the spine region of a bound document. In the book scan mode, a page height detector mounted on a scan carriage accounts for the deviation of a book page from the horizontal platen plane in the vicinity of a book's binding. In addition, electronic correction of the captured image is used to compensate for loss of focus, image compression, and uneven illumination. Besides electronic correction, the quality of captured images is maximized by modifying mechanical parameters such as scan rate, and local light source intensity.

Other face-down scanning arrangements minimize the stress on the spine region of bound documents by forming a wedge or an angled platen. Examples of wedge platens for scanning bound documents include, U.S. Pat. No. 5,359,207 to Turner and German Patent DE-A1 3546404. Turner discloses a book scanner with contact imaging that employs two-dimensional sensor arrays that are attached at a common edge and disposed in a wedge shaped manner. German Patent DE-A1 3546404 discloses a roof-shaped book support apparatus for use in a copier application. The optics of the roof-shaped copier arrangement provide that opposing pages of a bound book are simultaneously imaged in the same image plane.

In alternate arrangements, platenless scanners capture image data with a document in a face-up position. Such arrangements do not require additional stress to be applied the binding region of a document when scanned since the document is scanned in its natural open condition. For example, platenless scanners that record a bound document opened face-up from above are disclosed in U.S. Pat. Nos.: 5,084,611; 5,377,019; and 5,416,609. Specifically, U.S. Pat. No. 5,084,611 discloses a document reading apparatus which is disposed above a document table. Curves of the bound document are detected using a curvature detector which includes a linear light source. In addition, the linear light source defines a brightness distribution which is used to rectify image signals received from the document reading means. U.S. Pat. No. 5,377,019 discloses a reading apparatus which can determine an effective image pickup area containing objects such as an operator's hand. U.S. Pat. No. 5,416,609 discloses an image pickup apparatus with a focus adjusting means for controlling an imaging optical system so that an image is in focus on a line sensor during scanning.

In either face-down or face-up scanning arrangements, image profile measurements must be precise so that image distortion caused by recording non-planar original images can be accurately corrected. Linear light stripping is one method for measuring the profile of a non-planar original image, the basic principles of which are described by Ballard et al. in "Computer Vision", Prentice-Hall, 1982 pp. 52–54. Ballard et al. also discloses other methods for measuring the profile of a non-planar original image such as laser based spot range finders and ultrasonic range finding. With each of these range finding techniques geometrical information can be used develop a profile of a non-planar document. Once a profile of a non-planar original image is developed, original image data is de-warped so that it appears planar. Some de-warping techniques transform recorded image data using image processing routines that correct skew, and compression or elongation caused by oblique viewing angles. Other de-warping techniques can be performed by adjusting different components of a scanning assembly. In the case of linear light stripping, the profile, which is measured as a grayscale image of a light stripe projected across a bound document, can be used to define a transformation to de-warp recorded image data.

A scanning system that determines the geometrical shape of a non-planar surface of a bound document from an image with a light stripe projected thereacross may not always develop an accurate profile of the non-planar surface. One source of inaccuracy is self-illumination which results when light from the light stripe is reflected onto other parts of the bound document. The reflections cause noise in the recorded image that must be distinguished from the light stripe projection. Another source of inaccuracy is the aspect ratio of a light stripe projector. The higher the aspect ratio the more area the light stripe illuminates a page. This may causes inaccuracies when abrupt transitions along the light stripe blur together. Yet another source of inaccuracy is noise. A further source of inaccuracy results when printed marks on a page of a bound document do on reflect light from the light stripe projector and cause dropouts along a recorded light stripe. Dropouts may become a significant source of error when they fragment the recorded light stripe into segments. Even though thresholding may eliminate many sources of noise, the geometrical shape of a bound document may not eliminate noise resulting from a very sharp spine region. Given these sources of inaccuracy, it would be desirable to provide a scanning system that can accurately detect a light stripe in an image recording a light stripe projected across a non-planar bound document. Once the geometrical shape of the non-planar surfaced of a bound document is determined, the scanning system can transform non-planar image data to appear planar.

SUMMARY OF THE INVENTION

In accordance with one aspect of the invention, there is provided a method for determining a shape of the bound document positioned in an imaging area of a scanning apparatus having an image acquisition system for recording images and a light stripe projector for projecting a light stripe. The method includes the steps of: recording, with the image acquisition system, an image of the bound document having a light stripe projected thereacross by the light stripe projector, the image being defined by an array of scan lines, with each scan line having pixels with an intensity value; adaptively thresholding the pixels forming the image to identify pixels defining part of the light stripe, the adaptive thresholding step compensating for non-uniform illumination across the bound document recorded by the image acquisition system; identifying a pixel starting location that forms part of the light stripe on a first scan line near a midpoint of the image; tracking, from the pixel starting location, a first set of pixels that further define the light stripe in the image, the set of pixels representing a trace of the light stripe projected across the bound document; smoothing the first set of pixels to minimize large transitions between scan lines; detecting a crease location along the first set of pixels that identifies a spine region of the bound document; and responsive to the detecting step, modifying the first set of pixels representing the trace, the modifying step replacing pixels near the crease location with a second set of pixels that are determined using a parametric model that approximates the spine region of the bound document.

In accordance with another aspect of the invention, there is provided a method for scanning a sequence of non-planar original images of a bound document. The method includes the steps of: recording geometry data and raw image data for each image in the sequence of non-planar original images, the recording step including the steps of: projecting a light stripe on a non-planar original image, acquiring geometry data with an image acquisition system, extinguishing the light stripe, and acquiring raw image data with the image acquisition system; correcting the recorded raw image data for each image in the sequence of non-planar original images with the recorded geometry data, the correcting step performing, for each image in the sequence of non-planar original images, the steps of: determining a page shape transform with the geometry data, and de-warping the recorded image data with the page shape transform to provide corrected image data.

BRIEF DESCRIPTION OF THE DRAWINGS

These and other aspects of the invention will become apparent from the following description which illustrates preferred and alternative embodiments of the invention read in conjunction with the accompanying drawings wherein the same reference numerals have been applied to like parts and in which.

DETAILED DESCRIPTION

Figure 1:
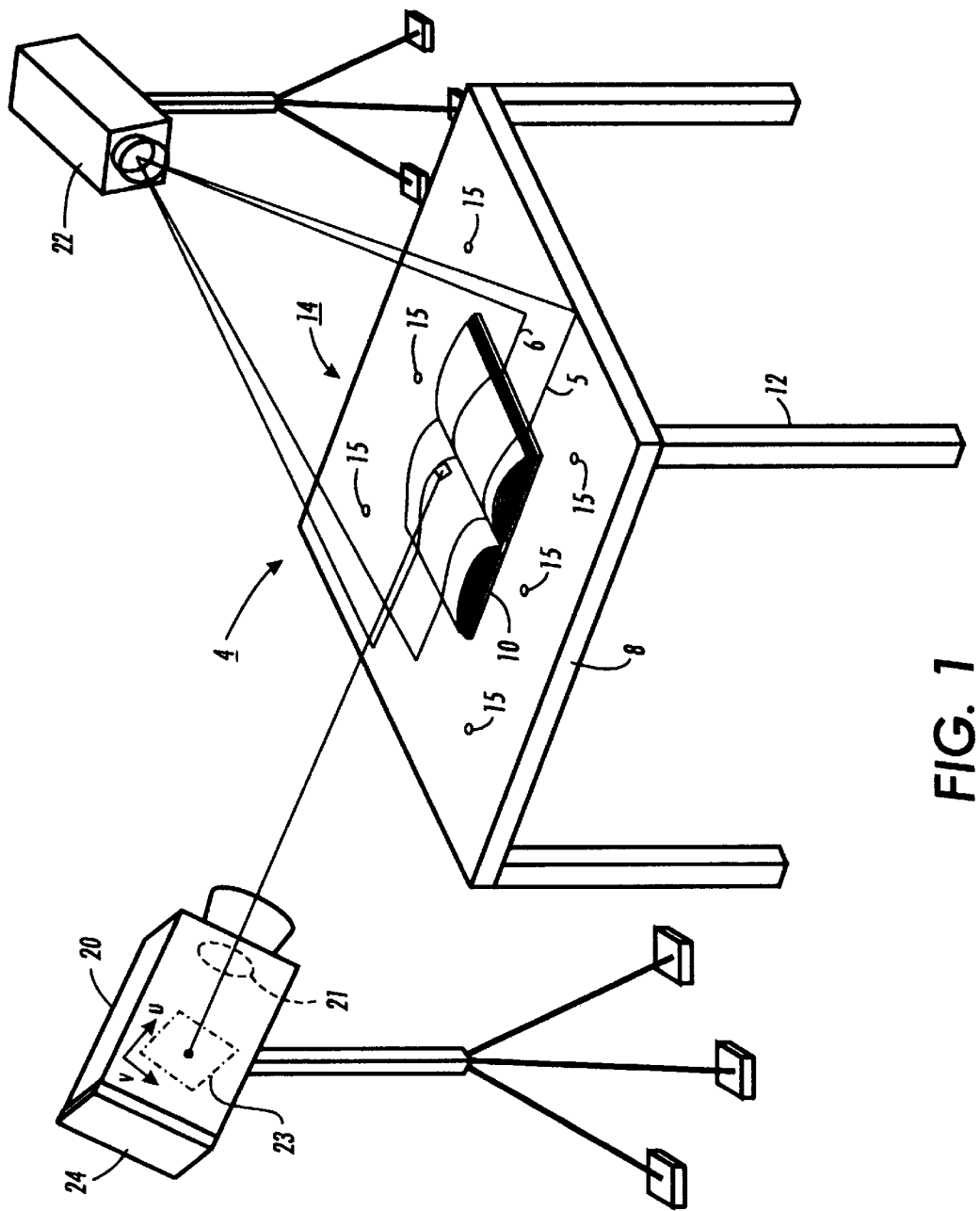
FIG. 1 is an illustration of a system for scanning bound documents incorporating the present invention.

Referring now to the drawings where the showings are for the purpose of describing the preferred embodiment of the invention and not for limiting same, FIG. 1 shows a bound document scanning system 4 incorporating the present invention. Generally, the bound document scanning system 4 includes a platform 8 for supporting a bound document 10 in an open condition. The platform 8 is supported by legs 12. By providing removable or foldable legs 12, the platform 8 is portable and can be readily transported from one location to another. Built into platform 8 is a calibration system which includes marks 15, the calibration system being generally designated by reference numeral 14. In addition to the platform 8 and the calibration system 14, bound document scanning system 4 includes an image acquisition system 20, a light stripe projection system 22, an electronic subsystem system 24 (ESS). Each of the elements of the scanning system 4 are not positioned in an assigned location relative to each other. When the scanning system 4 is positioned in a new location, the calibration system 14 is used to orient the image acquisition system 20 relative to the platform 8.

Image acquisition system 20 in a preferred embodiment is a high resolution digital color camera having internal optics, shown generally by reference numeral 21, that focus an image on internal focal plane 23. The high resolution camera contains an array of active photosensors that convert optical image data into electrical signals. Photosensor arrays are well known in the art and include two-dimensional flat panel detectors and one-dimensional and two-dimensional charge coupled devices (CCDs). An example of a flat panel detector is disclosed in U.S. Pat. No. 5,017,989, and an example of a scanning carriage system using a one-dimensional CCD array is disclosed in U.S. Pat. No. 5,276,530, the disclosures of which are incorporated herein by reference.

Light stripe projection system 22 is used by the scanning system 4 to measure the surface shape of bound document 10 by projecting across the bound document 10 on platform 8 one or more stripes of light that are identified by numerals 5 and 6 in FIG. 1. The basic principles of light striping are described by Ballard et al. in "Computer Vision", Prentice-Hall, 1982 pp. 52–54. Light striping is a type of structured light in which the illumination of an object in a scene is used to extract geometrical information about the object itself. Here, light striping is used to identify the shape of bound document 10 on platform 8. More specifically, light striping is performed in order to detect the three-dimensional shape of a page and thereby correct distortions cause by image perspective, skew, and compression or elongation introduced by oblique viewing angles of image acquisition system 20. The light-stripe source 22 can contain a laser or an ordinary light bulb that projects an image of a slit. It should be understood, however, by those skilled in the art that there exists a number of different methods which can be used to measure the surface shape of a bound document. In alternate embodiments, the three-dimensional surface of a bound document can be measured using stereo vision, laser range-finding, sonar rangefinding, projection of a grid, or an alternate mechanical means.

After recording a digital representation of light stripes formed across the bound document 10 using image acquisition system 20, ESS 24 analyzes the digitally recorded image data to identify the shape of the open pages of bound document 10. A microprocessor and control software, which forms ESS 24, coordinate the general operational units of document scanning system 4. ESS 24 which communicates with calibration system 14, image acquisition system 20, and light stripe projection system 22, can either be integral with image acquisition system 20, as shown, or stand alone as part of a computer workstation or the like.

Figure 2:
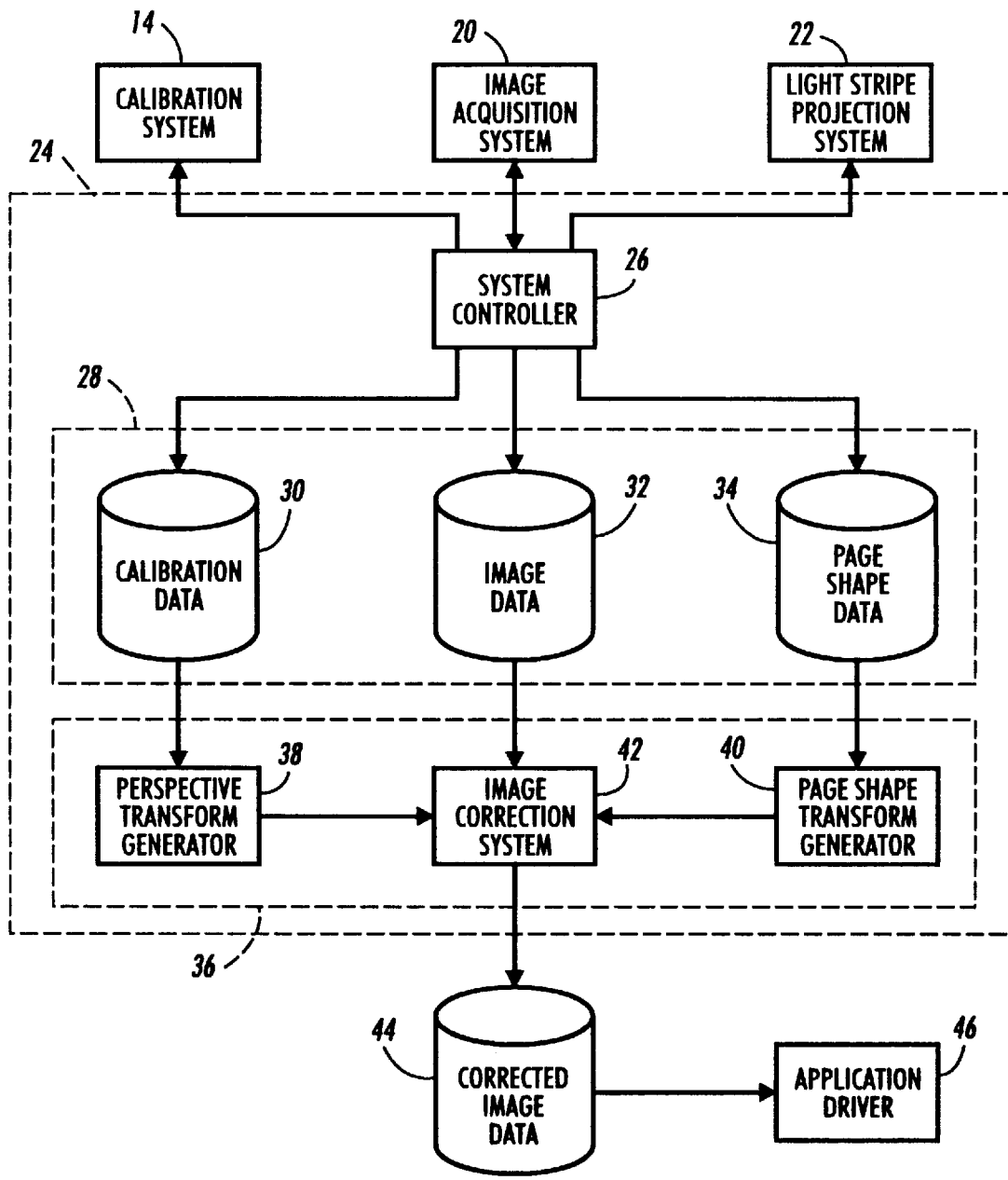
FIG. 2 is a block diagram of the system architecture of the scanning system shown in FIG. 1.
Figure 4:
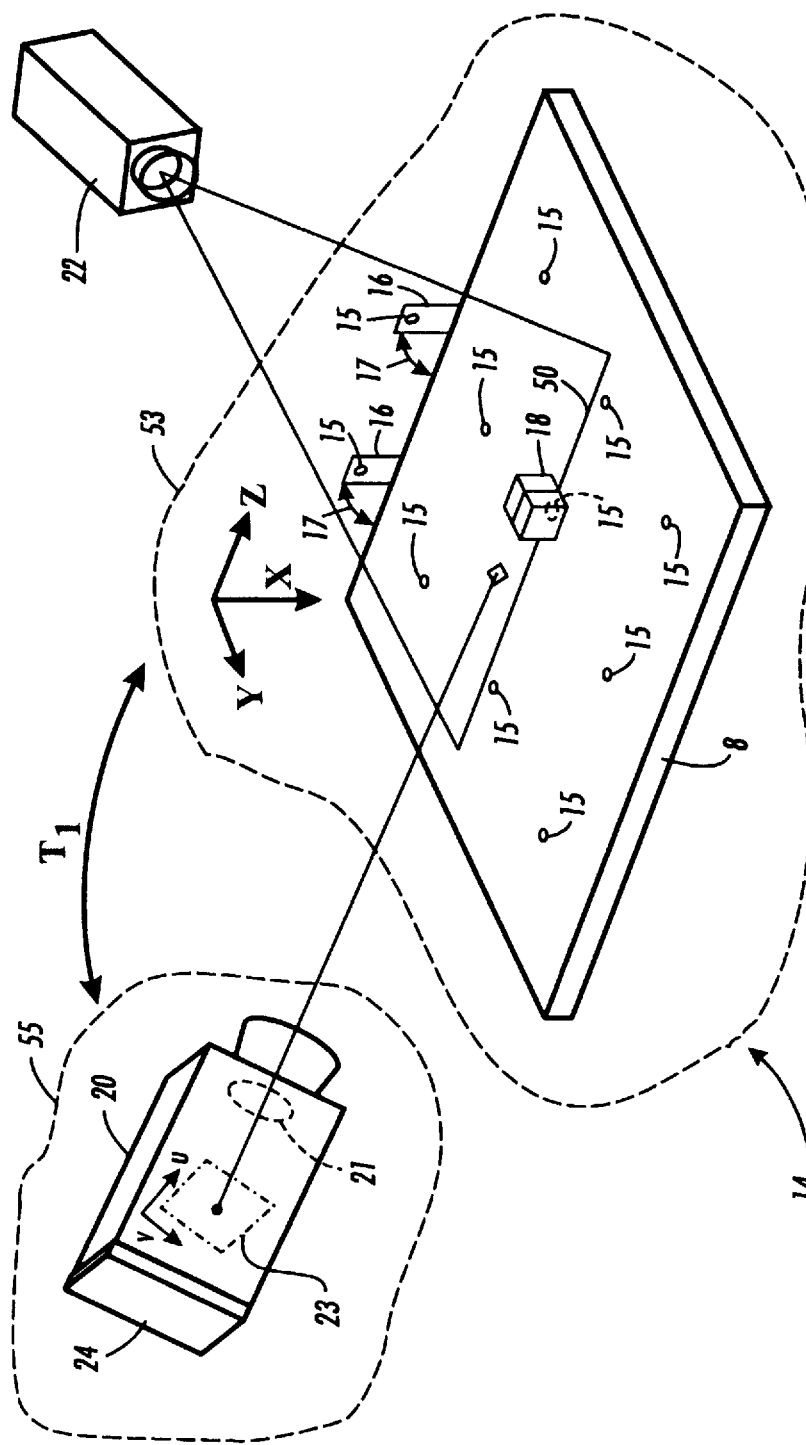
FIG. 4 is an illustration of the calibration system of the scanning system.

FIG. 2 shows a general block diagram of the system architecture of scanning system 4. When operating, scanning system 4 is in one of four states: calibrating, determining page shape information, scanning image data, or de-warping image data. The system controller 26, which forms part of ESS 24, coordinates operations of calibration system 14, image acquisition system 20, and light stripe projection system 22. In operation, depending on the current state of the scanning system 4, system controller 26 selectively invokes calibration system 14 or light stripe projection system 22. When invoking the calibration system 14, either calibration object 18 or movable tabs 16 are put in place (as shown in FIG. 4), and when invoking the light stripe projection system 22, one or more light stripes 5 and 6 are obliquely projected across platform 8. Digital image data received by system controller 26 from image acquisition system 20 is stored on a storage device shown generally by reference numeral 28. The storage device 28 may include RAM, flash memory, floppy disk, or another form of optical or magnetic storage. Depending on whether calibration system 14 and light projection system 22 are invoked, digital image data received by system controller 26 from image acquisition system 20 is stored on storage device 28 either as calibration data 30, image data 32, or page shape data 34.

Once stored on storage device 28, image data is manipulated by image processing system 36 which includes a perspective transform generator 38, a page shape transform generator 40, and an image correction system 42. Perspective transform generator 38 uses image calibration data 30 to provide a perspective transform ($T_1$). The perspective transform ($T_1$) defines an interrelationship between a two-dimensional image coordinate system of the image acquisition system 20 and a world coordinate system in which a page of a bound document is represented in three dimensions. Page shape transform generator 40 uses stored page shape data 34 to provide a page shape transform ($T_2$). The page shape transform (T2) defines an interrelationship between the world coordinate system and a page coordinate system which defines an output space in which a page of bound document 10 is represented in two dimensions. The image correction system 42 generates corrected image data 44 from image data 32 using the perspective transform ($T_1$) and the page shape transform (T2). The corrected image data 44 is either stored on storage device 28 or output directly to a peripheral device through application driver 46. Application driver 46 transmits corrected image data 44 to any peripheral device adapted for displaying, storing, or reproducing as hardcopy corrected image data 44.

Figure 3:
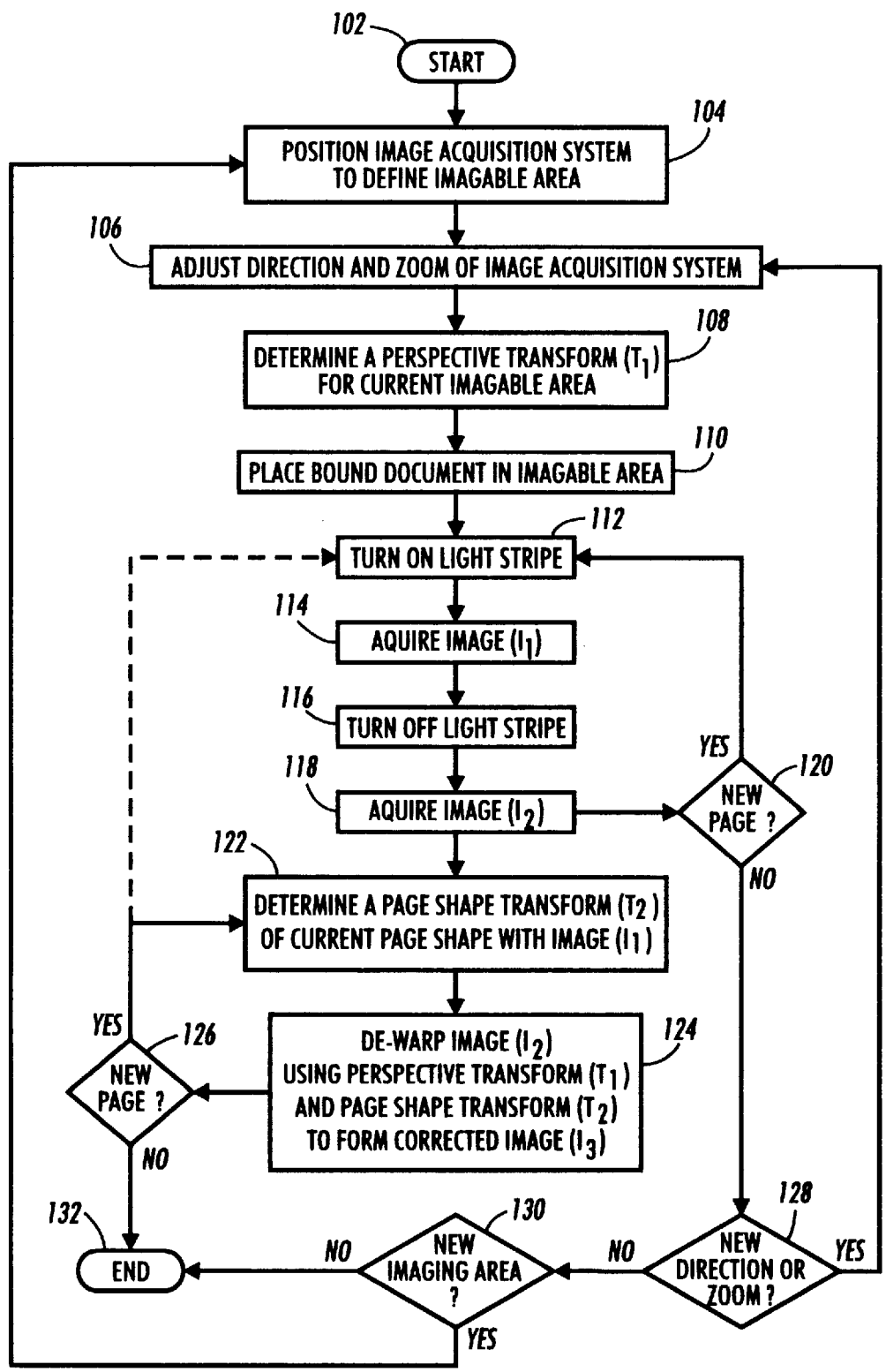
FIG. 3 is a flow diagram showing the general steps for acquiring image data of a bound document using the scanning system incorporating the present invention.

FIG. 3 is a flow diagram showing the general steps for acquiring image data with the bound document scanning system 4. At step 102, the scanning system 4 is set up as shown in FIG. 1. At step 104, a system operator positions the image acquisition system 20 to point at an imaging area, which is defined herein as an area that is recorded on internal focal plane 23 of image acquisition system 20. Subsequently, if necessary the system operator at step 106 adjusts the direction and zoom of image acquisition system 20. At step 108, ESS 24 calibrates the image acquisition system 20 to the imaging area defined at steps 104 and 106 with a perspective transform ($T_1$). After system calibration at step 108, the system operator places bound document 10 on platform 8 in the imaging area at step 110. At step 112, light stripe projection system 22 is turned on. At step 114, an image ($I_1$) of a light stripe projected across bound document 10 is acquired by image acquisition system 20. At step 116, the light stripe projection system 22 is turned off. At step 118, an image ($I_2$) of the bound document 10 is acquired without the projection of a light stripe across it. At step 120, if there is a new page to be scanned, steps 112, 114, 116, and 118 are repeated.

With continued reference to FIG. 3, at step 122 the image processing system 36 determines a page shape transform ($T_2$) of the current page shape using the image ($I_1$) acquired at step 114. At step 124, the image (I2) is de-warped to form a corrected image ($I_3$) using the perspective transform ($T_1$) determined at step 108, and the page shape transform ($T_2$) determined at step 122. Steps 122 and 124 are repeated at step 126 if a subsequent page is acquired at steps 112, 114, 116, and 118. It will be understood by those skilled in the art that the steps 112, 114, 116, and 118 can operate in sequence or in parallel with steps 122 and 124 depending on the performance requirements or the hardware constraints of scanning system 4. At step 128, if the system operator changes the direction or zoom, step 106 is repeated instead of step 112. Alternatively, if a new imaging area is selected by the system operator at step 130, step 104 is repeated. At step 132, if no more pages are to be scanned, system 4 remains in a ready state for scanning subsequent bound documents.

In accordance with the present invention, high-speed scanning of bound documents is enhanced by delaying electronic perspective correction of recorded images. Since a geometrical profile map (i.e. page shape data) and raw image data of an image is recorded at steps 114 and 116 independent from steps 122 and 124, image correction can be delayed or computed in parallel with image acquisition operations. For example, image correction at steps 122 and 124 can be delayed until such time as the bound document is to be viewed or rendered. In addition, when computational correction of raw image data is delayed until the raw image data is read (e.g. displayed on a terminal or reproduced on hardcopy), the overhead of image correction may be hidden from the reader by preparing additional pages of raw image data while a current page is read.

FIG. 4 shows calibration system 14 of the bound document scanning system 4 in detail. In general, two different elements of scanning system 4 require calibration. First, the image acquisition system 20 must be calibrated relative to the platform 8 in order that locations in the three dimensional space of the platform 8 can be identified in an image recorded along the focal plane 23 of image acquisition system 20. Second, the image acquisition system 20 and the platform 8 must be calibrated relative to the light stripe projector 22 in order that the height of an object on the platform 8 can be determined based on the position of a light stripe in an image recorded by the image acquisition system 20. To perform the calibration of two different elements of scanning system 4, the calibration system 14 includes calibration marks 15 on the surface of platform 8, and a calibration object 18. The calibration marks 15 are spaced at a predetermined interval from each other on platform 8 to define a support plane (X,Y). It will be understood, however, by those skilled in the art that the calibration marks 15 can be positioned so as to define a support surface having a non-planar shape such as a wedge. At least two of the calibration marks 15 are positioned outside the X,Y support plane of platform 8 to make calibration calculations more numerically stable. The two calibration marks 15 which are outside the support plane of platform 8 appear on movable tabs 16 that rotate out along side platform 8 when not in use, as indicated generally by arrows 17. The calibration object 18 when not in use is either removed from the surface of platform 8, or alternatively retracted into its surface. Once calibration is complete, a perspective transform ($T_1$) is provided by perspective transform generator 38 (shown in FIG. 2). The perspective transform ($T_1$) defines a transform between a world coordinate system (X,Y,Z), indicated generally by the reference numeral 53, which represents a three dimensional space of bound document 10 on platform 8, and an image coordinate system (u,v), indicated generally by reference numeral 55, which represents image pixels (or image data) in internal focal plane 23 in two dimensions.

Figure 5:
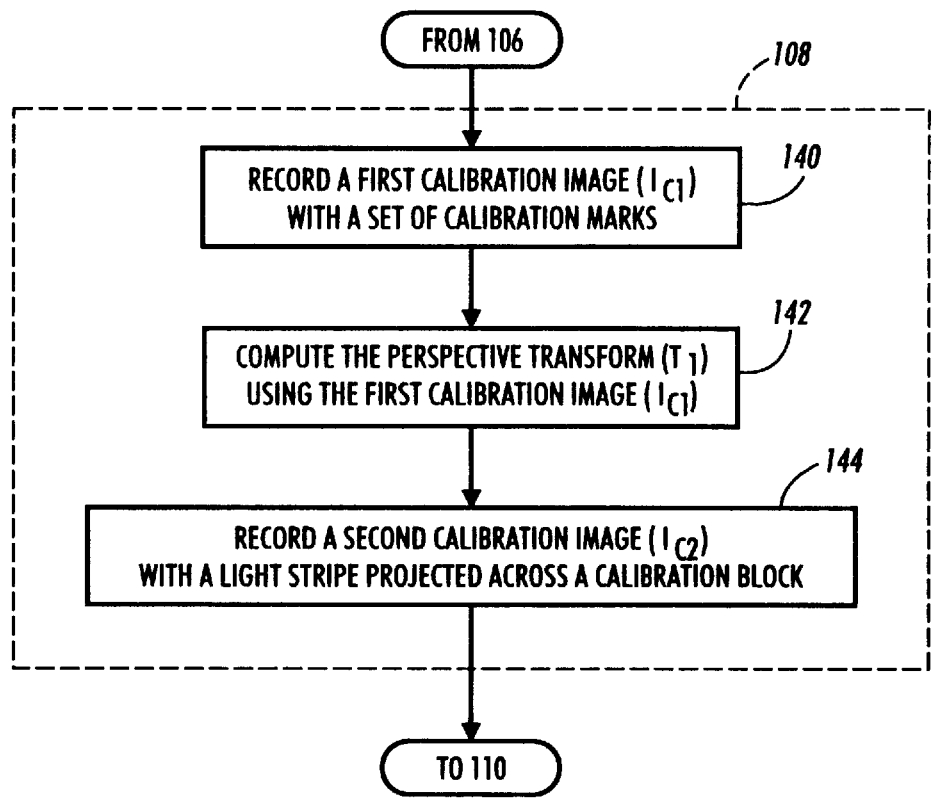
FIG. 5 is a flow diagram showing the general steps for calibrating the scanning system shown in FIG. 1.

FIG. 5 is a flow diagram that details the steps for performing calibration step 108 shown in FIG. 4. Generally at step 108, a perspective transform ($T_1$) is determined which calibrates the current imaging area defined at steps 104 and 106 in the image coordinate frame (u,v) with respect to the world coordinate frame (X,Y,Z). More specifically step 108 includes steps 140, 142, and 144. At step 140, a first calibration image ($I_{c1}$) is recorded which includes calibration marks 15 shown in FIG. 4. Step 140 is performed with the calibration marks 15 visible on movable tabs 16, but without positioning the calibration block 18 on platform 8. During step 140, system controller 26 acquires the first calibration image ($I_{c1}$) from image acquisition system 20 and stores it as calibration data 30 (shown in FIG. 2). At step 142, perspective transform generator 38 computes a perspective transform ($T_1$) with calibration image (Icl) using standard calibration techniques. For example, the image acquisition system 20 can be calibrated using the technique disclosed by Strat in "Recovering the Camera Parameters from a Transformation Matrix," published in "Readings in Computer Vision: Issues, Problems, Principles, and Paradigms," Morgan Kaufmann Publishers Inc., 1987, the pertinent portions of which are incorporated herein by reference. Once determined, perspective transform ($T_1$) provides a mapping between any point in the world coordinate system (X,Y,Z) and any point in the image coordinate system (u,v).

At step 144, light stripe 50 is projected at an oblique angle by light stripe projection system 22 across calibration block 18 which is of a known height. During step 144, system controller 26 (shown in FIG. 2) directs the operation of calibration system 14 and light stripe projection system 22. Specifically at step 144, system controller 26 records a second calibration image ($I_{c2}$) with image acquisition system 20 and stores it as calibration data 30. For the purpose of describing the invention, the scanning system 4 is set up such that the projection of the light stripe 50 on the platform 8 falls along a single horizontal line of pixels (u) defining the internal focal plane 23 (u,v) of image acquisition system 20. It will, however, be understood by those skilled in the art that this assumption can be relaxed so that a bound document may be positioned so that the projection of light stripe 50 falls along several horizontal lines of pixels defining the internal focal plane 23. In the case of the light stripe falling along a single horizontal line of pixels, the vertical position (v) of this single horizontal line of pixels (along u) in the internal focal plane 23 can be defined as $v_{ls0}$, where v is in units of image pixels. In this example, the light stripe 50 is calibrated by placing calibration object 18, which is of a known height $h_{co}$, in the path of the light stripe 50. The image acquisition system 20 then records the position of the projection of the light stripe 50 on the top of calibration object 18. If the height of the calibration object 18 is defined in the internal focal plane 23 as $V_{lsh}$, then the height $h_b$ at a point on an arbitrary object, such as a bound document, at which the light stripe 50 projected thereon is viewed at an image scan line $v_b$ is given by:

$$h_b = (v_b - v_{ls0}) \frac{h_{co}}{v_{lsh} - v_{ls0}} \quad (1)$$

It will be understood by those skilled in the art that the light stripe calibration can be accomplished in many different ways. The purpose of light stripe calibration is to infer the height of each point in a bound document 10 above the surface of platform 8 when it is recorded on the internal focal plane 23 of the image acquisition system 20.

Figure 6:
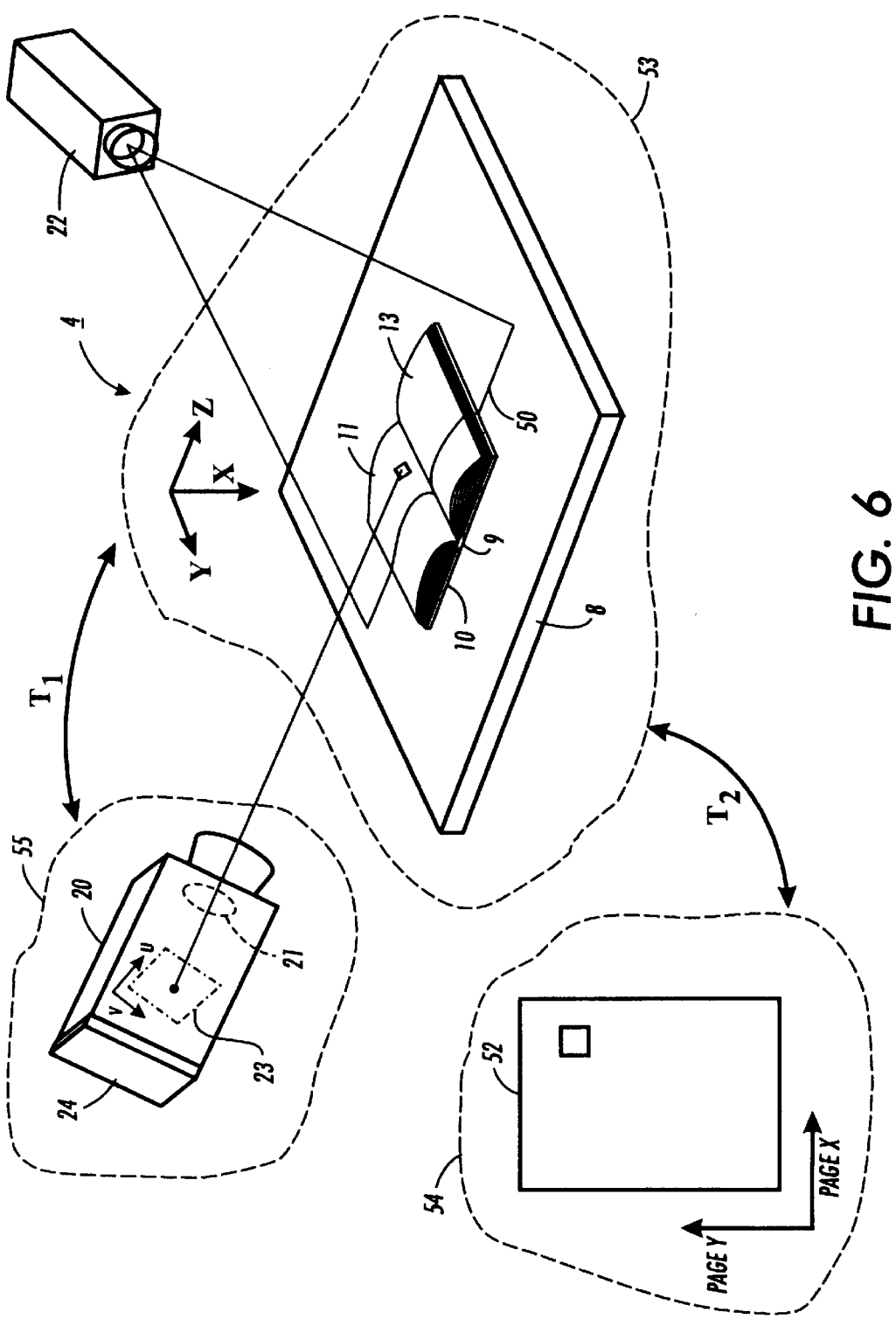
FIG. 6 shows a light stripe projected across a bound document in accordance with the present invention.

FIG. 6 shows a light stripe 50 projected across bound document 10. When recording pages 11 and 13 of bound document 10 two images are recorded by image acquisition system 20. As noted in FIG. 3 at steps 114 and 118, a first image ($I_1$) records bound document 10 with the light stripe projected across it and a second image ($I_2$) records bound document 10 absent the light stripe. The first image ($I_3$) is used by page shape transform generator 40 to determine a page shape transform ($T_2$). The page shape transform ($T_2$) defines a relationship between the world coordinate system 53 (X,Y,Z) and a page coordinate system (page x, page y), indicated generally by the reference numeral 54. The page coordinate system 54 (page x, page y) defines a two-dimensional space which is used to represent a virtual page 52 of the bound document 10 defined in the three-dimensional world coordinate system 53 (X,Y,Z). The virtual page 52 may, for example, represent either an image displayed on a video screen or a hard copy rendering by an electronic printing system. The second image ($I_2$) is used by image correction system 42 to determine a corrected image ($I_3$).

Figure 7:
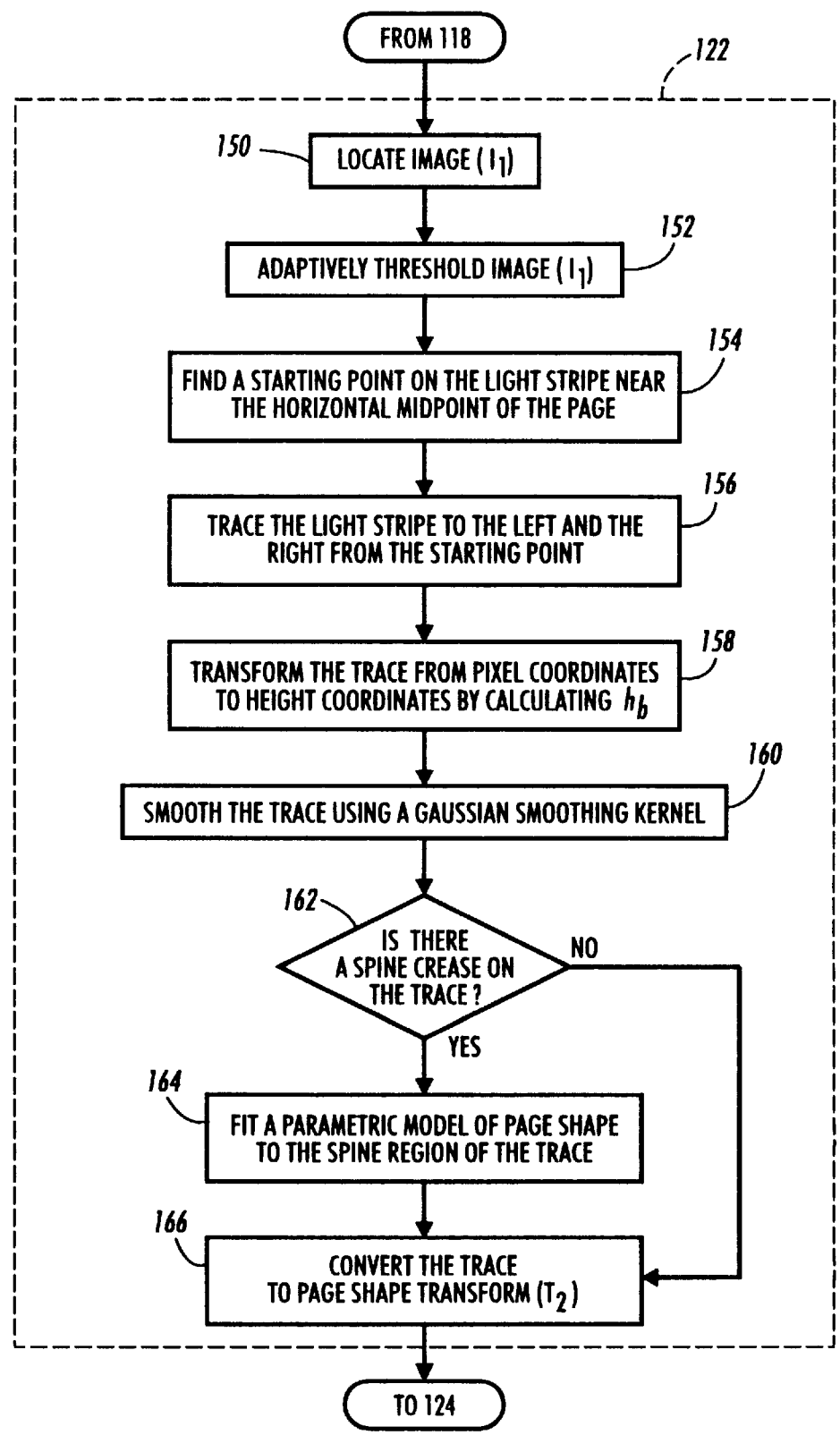
FIG. 7 is a flow chart of the steps for determining a page shape transform ($T_2$) with a first image ($I_1$) which is a recording of a bound document with a light stripe projected across it.

FIG. 7 is a flow chart of the steps for determining a page shape transform ($T_2$) with the first image ($I_1$) determined at step 122 shown in FIG. 3. The page shape transform ($T_2$) provides an estimate of the shape of bound document 10 from light stripe 50. In analyzing the light stripe in the first image ($I_1$) the following factors should be taken into consideration: the light stripe 50 is not the only visible object in the image ($I_1$); the intensity of the light stripe 50 and the intensity of the background of the bound document 10 vary across the image ($I_1$); the light stripe 50 is several pixels wide; the edges of the light stripe 50 are ragged and sometimes broken in the image ($I_1$) due to the light stripe projecting onto printed characters on pages 11 or 13 of document 10; the light stripe 50 becomes very steep in the spine region 9 of bound document 10; and there may exist spurious bright spots in image ($I_1$) not created by the light stripe.

While taking into account the above-noted factors, the following steps are performed to determine the page shape of the bound document 10. For simplicity, the following description assumes that the projection of light stripe 50 on platform 8 is perpendicular to the spine 9 of bound document 10. It will be understood, however, that this method for detecting a light stripe can be performed even if the path of light stripe 50 is not perpendicular to the spine 9 of bound document 10. In general, image ($I_1$) represents a profile of the page shape of the bound document 10. More specifically, the profile given by the light stripe 50 is a cross-section along an axis perpendicular to the spine 9 of the bound document 10. The following steps are performed to identify the light stripe 50 in image ($I_1$) which is then used to define the shape of bound document 10 to correct distortion of the second image ($I_2$). At step 150, an image ($I_1$) recorded by image acquisition system 20 is located by page shape transform generator 40 in memory 28 as stored page shape data 34. In the recorded image ($I_1$) the light stripe 50 is positioned to be generally aligned with the horizontal scan lines of the image ($I_1$). A horizontal scan line is defined herein as a scan line in image ($I_1$) that is perpendicular to a vertical scan line. The following discussion assumes that when the image acquisition system is a one-dimensional CCD array, a vertical scan line represents the fast scan direction and a horizontal scan line represents a slow scan direction. The following discussion further assumes that the spine 9 of bound document 10 is aligned approximately parallel to a vertical scan line, and approximately perpendicular to a horizontal scan line.

At step 152, the image ($I_1$) is adaptively thresholded to identify pixels in the image ($I_1$) that represent light stripe 50 by eliminating non-uniform illumination across bound document 10. The adaptive thresholding step 152 accounts for varying intensities between the light stripe 50 and the background of the bound document 10 recorded across image ($I_1$). Non-uniform illumination across image ($I_1$) occurs because the imageable area is open to ambient light, and because the reflectance of a page of bound document 10 is unknown. Specifically at step 152, each vertical scan line (v) in image ($I_1$) is sequentially processed by transform generator 40 a scan line at a time. For a current vertical scan line being processed, each pixel in the current vertical scan line is assigned an intensity value of zero except for those pixels having a brightness that is greater by a threshold amount than the brightness of each of the neighboring pixels a fixed distance above and below it on the current scan line, and that have at least as great a brightness as the brightest pixel along the current scan line, minus a tolerance amount. This thresholding step helps improve the contrast between recorded ambient light and recorded light representing the light stripe.

It will be understood by those skilled in the art that other means exist to improve image contrast between recorded ambient light and light recorded from the light stripe projector 22. For example, contrast can be improved by pre-filtering recorded light having the wavelength emitted by the light stripe projector 22. The pre-filtering step would take place before the recorded image ($I_1$) is adaptively thresholded at step 152. Alternatively, known image processing techniques that identify different color intensities can be substituted for the pre-filtering step. This image processing step initially thresholds from the recorded image ($I_1$) any light not having the wavelength projected by the light stripe projector 22, before the image ($I_1$) is adaptively thresholded at step 152. Image contrast can also be increased by emitting infra-red (IR) light with the light stripe projector 22. A projected IR light stripe can be recorded with a sensor sensitive to IR light. Alternatively, a projected IR light stripe can be detected using a sensor sensitive to both infra-red light and visible light with an IR filter mounted in front of the sensor.

At step 154, a starting point on the light stripe near a horizontal midpoint of the bound document 10 is located. The horizontal location of the starting point is defined as the horizontal midpoint of the image ($I_1$), plus or minus a fixed horizontal distance of approximately 20 pixels. The vertical location of the starting point, which is determined using an iterative process, is the vertical centroid of non-zero pixels within a window of pixels in the image ($I_1$). The vertical upper and lower dimensions of the window initially extend approximately 20 pixels, toward the vertical midpoint, from the top and bottom of the image ($I_1$), respectively. These dimensions, which define a window region, are refined using the iterative process to identify a portion of the light stripe in the image ($I_1$) along the vertical dimension. A first step of this iterative process is to compute the vertical centroid of the non-zero pixels within the window region of the image ($I_1$) adaptively thresholded at step 152. A second step of the iterative process is to redefine the vertical dimensions of the window as the location of the vertical centroid, plus or minus a fixed predetermined distance of approximately 40 pixels. A final step of this iterative process is to compute a new vertical centroid using the new window dimensions. These steps are repeated until the number of non-zero pixels contributing to the centroid is unchanged. This iterative process has the effect of excluding outlier pixels and centering the starting point on the brightest section of the image in the vicinity of the horizontal midpoint of the image ($I_1$), which is assumed to be the light stripe.

At step 156, the light stripe 50 is traced in the image ($I_1$) in each horizontal direction one vertical scan line at a time from the left and the right from the starting point found at step 154. (As defined above, a vertical scan line represents the fast scan direction and a horizontal scan line represents a slow scan direction of the scanning system 4.) Specifically, for each vertical scan line, pixels having a non-zero intensity value are collected within a neighborhood a small vertical distance from a vertical location of the light stripe identified in the previous scan line. The vertical location of the light stripe for a scan line is defined as the centroid or average in all dimensions of the pixels in the neighborhood. If no pixels have a non-zero intensity value in the neighborhood, the vertical distance is increased by an incremental amount and the new neighborhood searched for pixels with a non-zero intensity value. If the neighborhood distance reaches a predetermined maximum value for a current scan line, then the search for a vertical scan line location is abandoned and the vertical scan line location of light stripe from the previous vertical scan line is taken as the current vertical scan line location before processing a subsequent scan line. Upon completing step 156, a trace of the light stripe 50 recorded in image ($I_1$) which represent the contour of the surface of the bound document 10 is determined.

At step 158, the trace determined at step 156 for light stripe 50 in image (I₁) is transformed from pixel coordinates to height coordinates by calculating $h_t$ for each pixel as defined by equation (1) set forth above. At step 160, the trace is smoothed using a Gaussian smoothing kernel. Smoothing is performed in order to average out the existence of large dropouts or large transitions between vertical positions that can exist in a trace of the light stripe. For example, the light stripe 50 in image (I$_i$) can be broken at certain vertical positions because the light stripe is projected onto a printed character on a page of document 10. Accordingly at step 156, if one or more pixels is not found to identify the light stripe on a vertical scan line, then the position of the previous scan line is used to define the trace of light stripe in image (I₁). As a result, large dropouts or jaggies caused by pixels not defining the light stripe on particular scan lines are smoothed between other pixels forming the trace.

At steps 162, the trace of the light stripe is searched to determine whether a bound document has a spine region 9. The spine region 9 of a bound document is defined herein as the location for which a "spininess" measure is at a maximum. The equation $h_l + h_r - 2h_c$ is used to quantitatively measure the "spininess" of a vertical scan line (i.e. a scan line along the fast scan direction), where $h_c$, is the height of the trace of the light stripe at a given vertical scan line, and $h_l$, and $h_r$ are the height of the trace a fixed number of vertical scan lines to the left and right, respectively, of the location $b_c$. This "spininess" measure is used to assess the degree to which the spine of a bound document is centered at a given vertical scan line in image (I$_i$) along the trace of the light stripe (i.e. centered at a position along the slow scan direction). If the maximum "spininess" measure falls below a preset threshold height then the trace of the light stripe is determined not to contain a book spine shape.

If a spine is detected at step 162, a parametric model of page shape near the spine region is fit to the trace of the light stripe to improve the page shape estimate in the vicinity of the spine region at step 164. This step is performed because the trace of the light stripe tends to be noisy in the spine region. The spine region of the bound document more so than any other region along the trace of the light stripe is not well identified by the raw data in image (I$_i$). To more accurately identify the spine region of a bound document in the trace of the light stripe, noisy raw profile data is replaced with a parabolic model on each side of the spine in image (I₁). The parabola is fit to the height of the trace of the light stripe at the spine location identified at step 162, and to the height and tangent of the smoothed profile at a fixed predetermined number of vertical scan lines away from the spine.

Referring to the Appendix which includes Sections A–D, the portions of which are incorporated as part of the present description, detail an implementation in C source code of the steps of FIG. 7. Section A of the Appendix is source code for providing general geometry support. Section B of the Appendix is source code directed at the calibration of the scanning apparatus. Section C of the Appendix is source code for estimating page shape. Section D of the Appendix is source code directed at capturing and de-warping images.

It will be understood by those skilled in the art that steps 152, 154, 156, 158, 160, 162, and 164 can be performed on an image (I₁) that has more than one light stripe recorded therein. In the event a plurality of light stripes are recorded in image (I₁), step 154 is modified to detect a starting point for each light stripe generated by projection system 22. Subsequently for each starting point identified at step 154, a trace for each light stripe of bound document 10 is determined at steps 156, 158, and 160. By using a plurality of light stripes, a three dimensional contour of the surface of bound document 10 can be determined.

Figure 8:
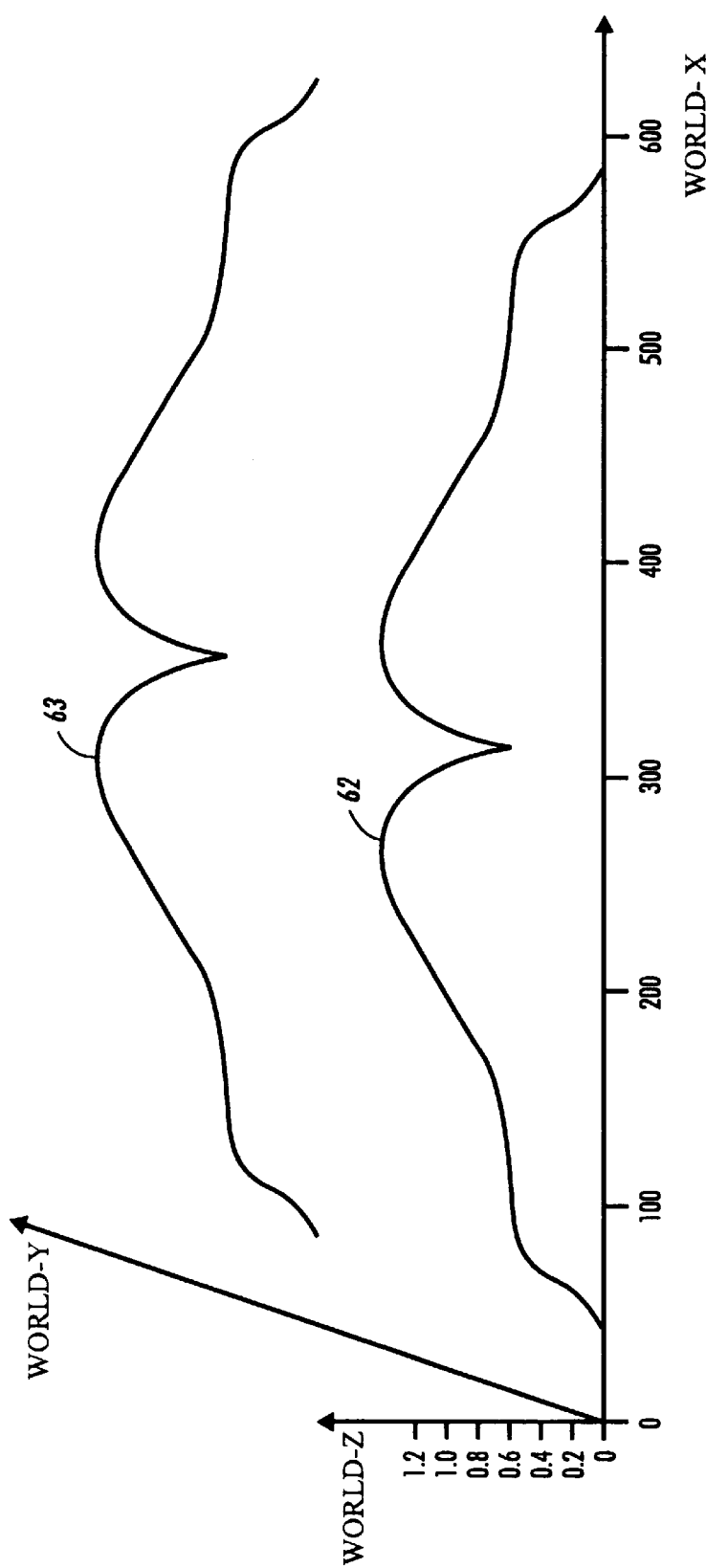
FIG. 8 is a graph of the trace of a light stripe.
Figure 9:
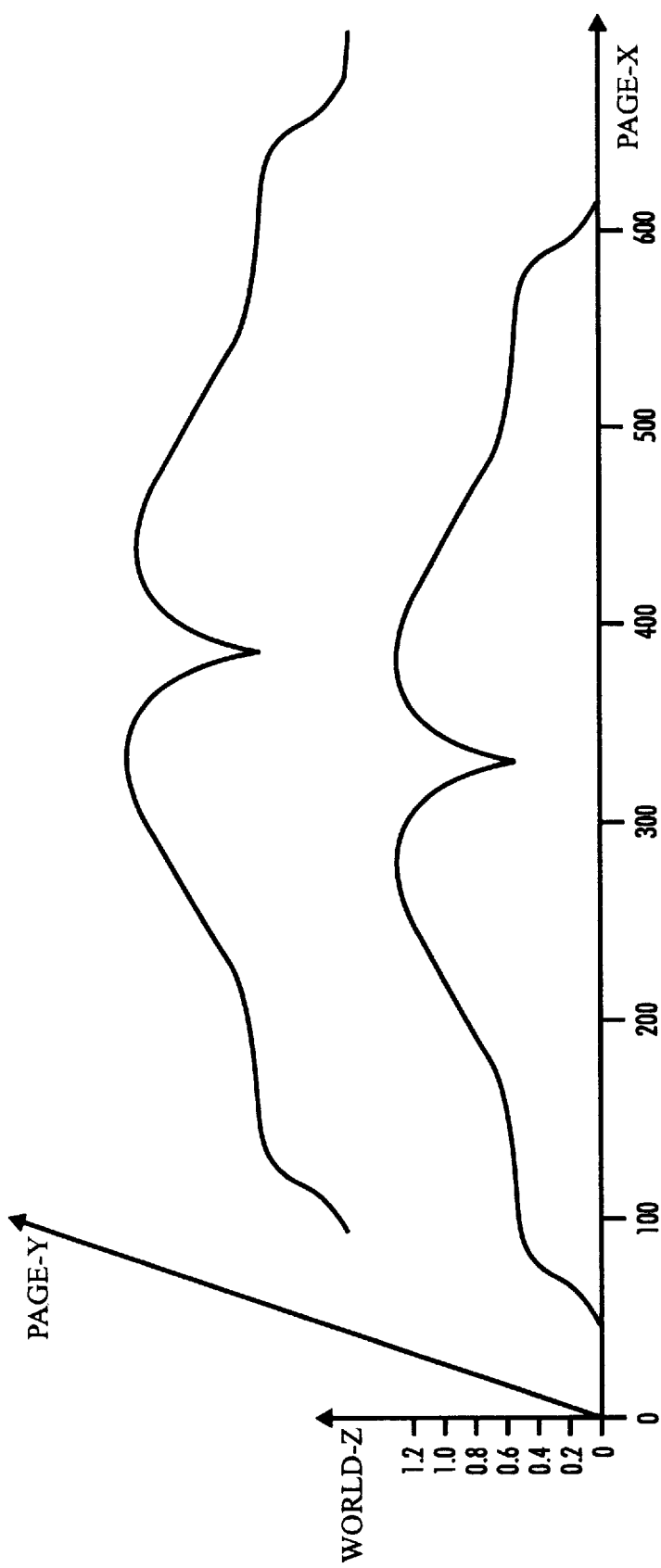
FIGS. 9, 10, and 11 illustrate lookup tables that define a page shape transform ($T_2$) that corresponds to the trace of a light stripe shown in FIG. 8.
Figure 10:
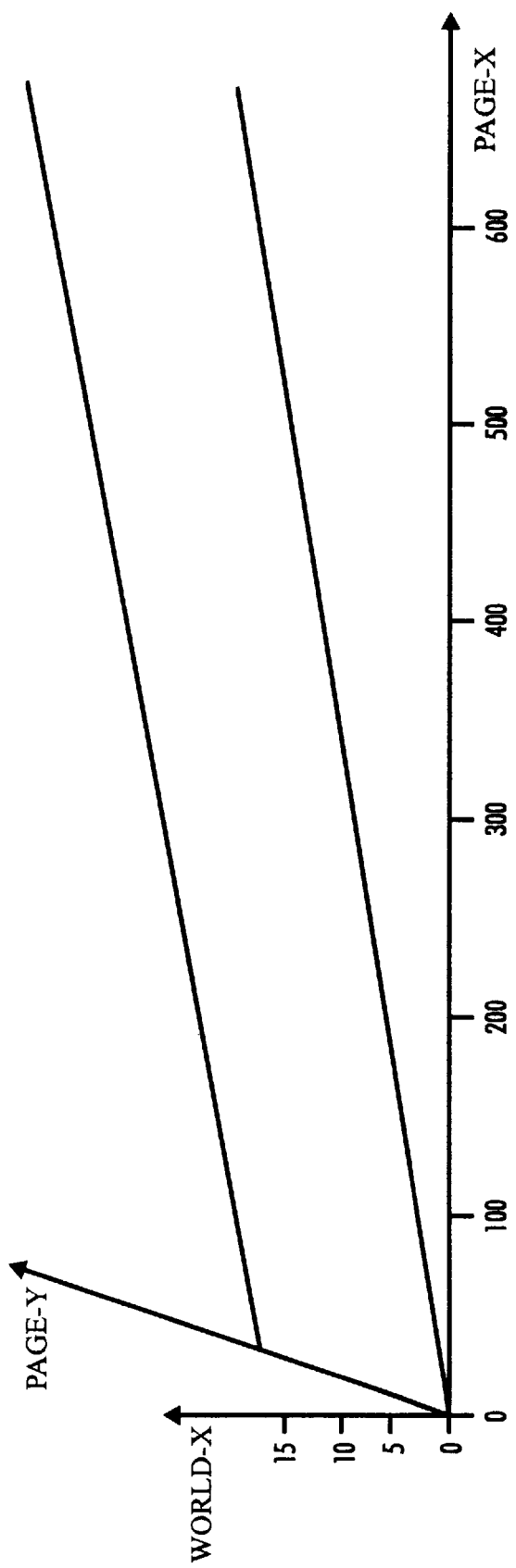
Figure 11:
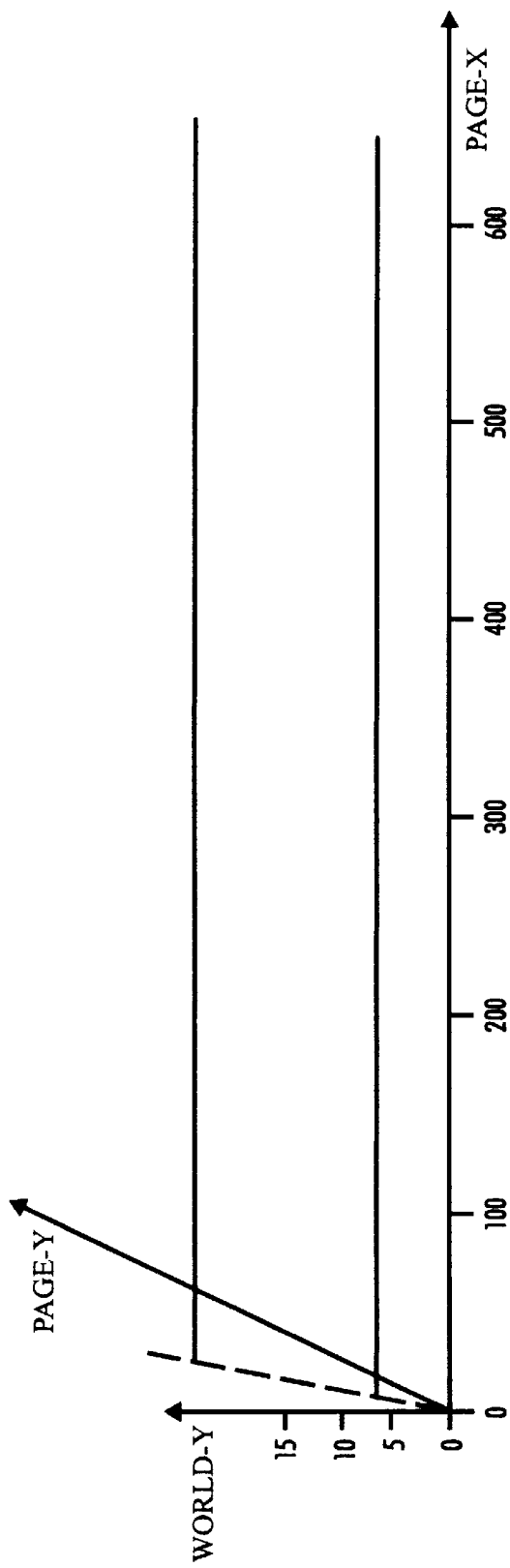

At step 166, the traces of any projected light stripes are converted to a page shape transform (T₂) such as a lookup table. For example, FIG. 8 is a graph of traces 62 and 63 of the light stripes 5 and 6 shown in FIG. 1. The traces 62 and 63 of light stripes 5 and 6 are defined in world coordinates (world-x, world-y, and world-z). The two light stripes 5 and 6 which are recorded as raw data in an image (II), are evaluated by page shape transform generator 40 to define traces 62 and 63 that represent the distributions formed by light stripe projection system 22 on bound document 10. The traces 62 and 63 are traced, transformed, and smoothed as set forth in steps 156, 158, and 160 in FIG. 7. In addition, if a spine region is detected in each profile 62 and 63, the regions is fit with a parametric model of a page shape as set forth at step 164. After linear interpolation and integration of the traces 62 and 63, graphs shown in FIGS. 9, 10, or 11 are generated. These graphs, which represent lookup tables, provide mappings between the world coordinate system (X,Y,Z) and the page coordinate system (page x, page y).

Figure 12:
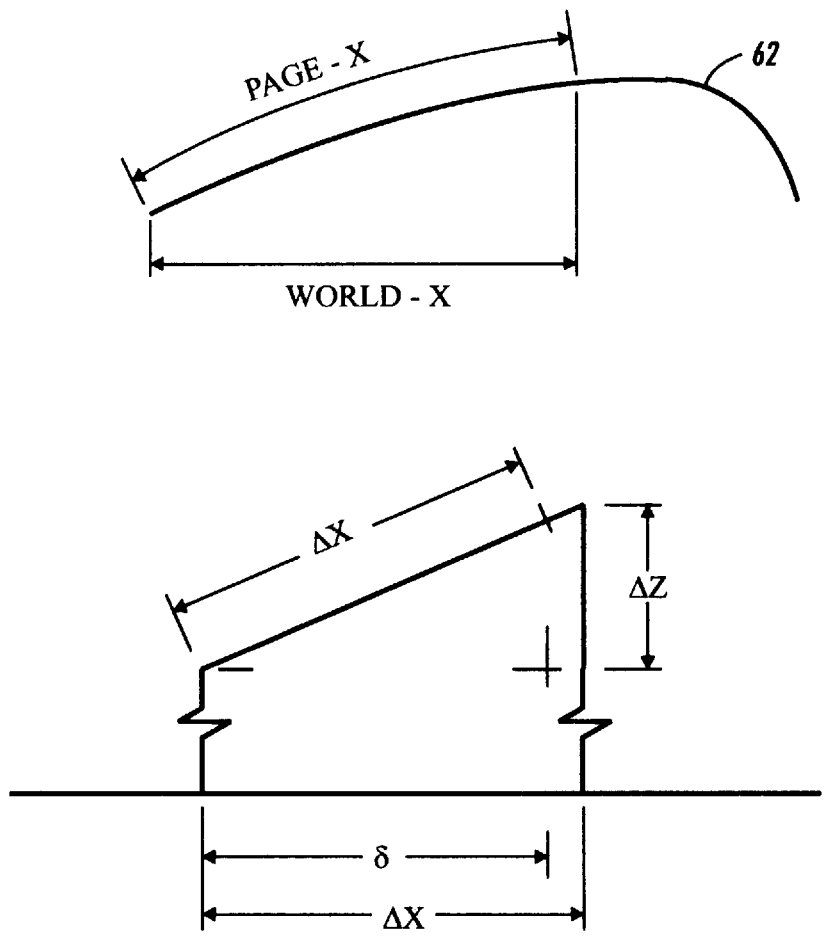
FIG. 12 illustrates a geometry that can be used to track a location in a world coordinate system while determining a location in a page coordinate system for a trace of a light stripe.

FIG. 12 illustrates a two-dimensional geometry that can be used to track a location in world coordinates while determining a location in page coordinates for light stripe trace 62. Specifically, the trace 62 defines page height and location in world coordinates in two dimensions. Using this geometry, values for page-x are determined by taking unit steps Δx along the trace 62 while keeping track of the current location in world coordinates. In this example, world-z values versus page-x values may be determined by linear interpolation, while world-x values versus page-x values may be determined using numerical integration of steps δ in the world coordinate system. δ is defined as:

$$\delta = \frac{\Delta x^2}{\sqrt{\Delta x^2 + \Delta z^2}},$$

where δ, Δx, and Δz are defined in FIG. 12.

Subsequent to determining the lookup tables shown in FIGS. 9–11, the lookup tables are registered to insure correct positioning of the bound document between the image and page coordinate systems. The tables are registered because the origin of each coordinate system may not be property aligned. The registration of lookup tables shown in FIGS. 9–11 can be performed by referring to the location of the spine crease detected at step 162. Registering two lookup tables in two dimensions involves registering world-x versus page-x, and world-z versus page-x lookup tables. In this example, a location $x_{cpp}$ in image coordinates that identifies the crease of a trace of a light stripe found at step 162 is mapped into a new location $x_{cw}$ in world coordinates using the camera perspective transform (T₁) determined at step 142. An index $x_{pp}$, into the trace of a light stripe of the world x-origin (i.e. corresponding to world x=0) is given by the expression:

$$x_{Opp} = x_{cpp} - x_{cw} ppi$$

where "ppi" is the factor pixels-per-inch determined by the focal length of the image acquisition system 20 and the distance from the image acquisition system to the location where the light stripe projects onto platform 8. The index $x_{opp}$ into the trace of the light stripe is transformed into an index $x_{oxxz}$ in the world-x versus page-x, and world-z versus page-x lookup tables during the numerical integration process of constructing lookup tables defining page shape transform ($T_2$) shown in FIG. 12. More generally, the index $x_{Opp}$ defines a shift that is used to correctly align the crease of the trace in the page coordinate system in the image coordinate system. Defining the shift requires that a reference point, namely the crease of the trace in the image coordinate system, is found in the page coordinate system using the perspective transform ($I_1$). However, if no crease is detected at step 162, the origin in the page coordinate system is assumed to be zero in the world coordinate system.

Figure 13:
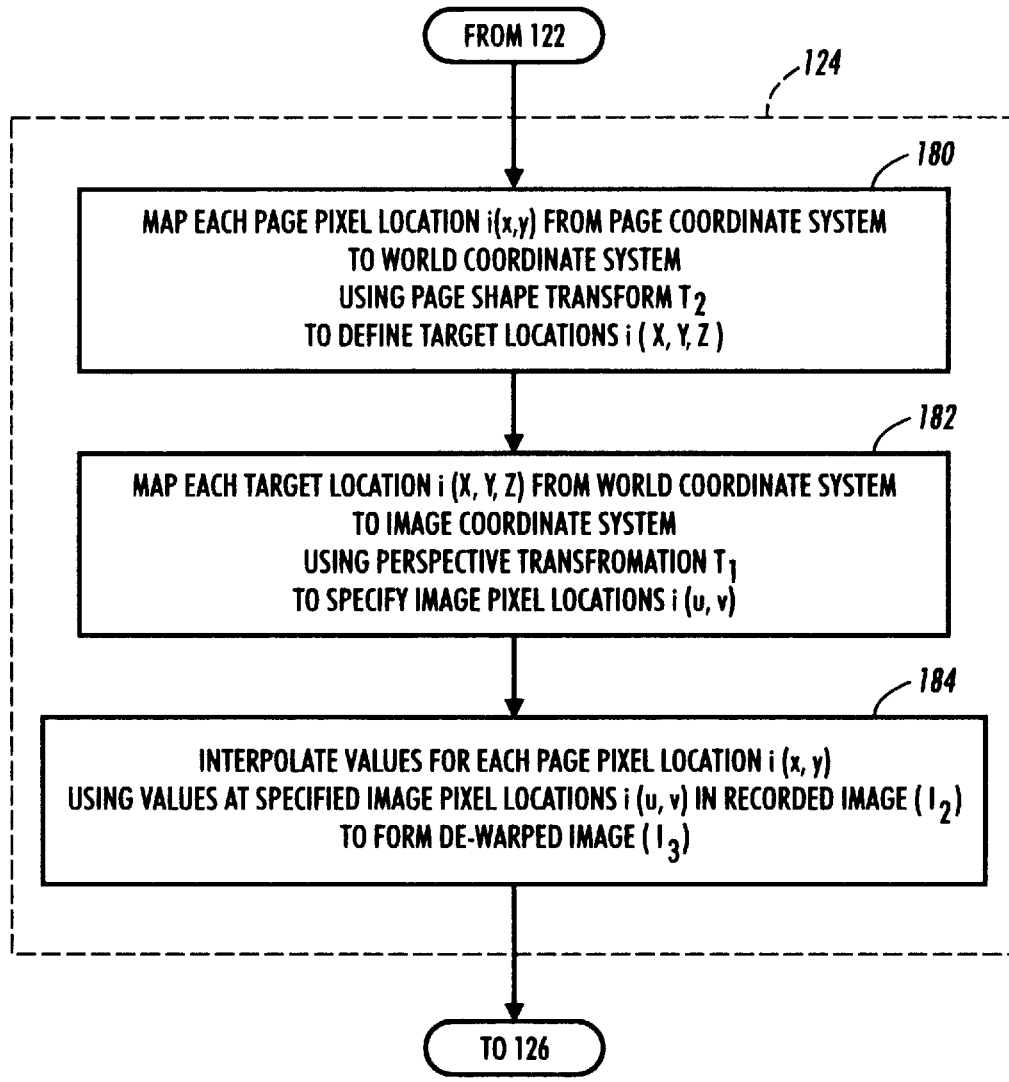
FIG. 13 is a flow chart detailing the steps for de-warping a recorded image using a perspective transform and a page shape transform.

FIG. 13 is a flow chart detailing the step 124 shown in FIG. 3. More specifically, FIG. 13 shows the steps required to reconstruct de-warped image ($I_3$) using a "polling" model. Specifically, using the "polling" model a location for each pixel in the de-warped image ($I_3$) is determined in the image ($I_2$). The de-warped image ($I_3$) is reconstructed by proceeding along an image in a vertical raster fashion, where the y-axis is the raster or fast scan direction. The color or gray density of each pixel in the de-warped image ($I_3$) is determined by locating the position of that pixel in the recorded image ($I_2$). Once a position is located in the recorded image ($I_2$), depending on the location (i.e. how well it overlaps with the pixel boundaries in the recorded image), the polling operation may require access to several image pixels in the recorded image ($I_2$) to reconstruct one output pixel in the de-warped image ($I_3$).

At step 124, de-warped image ($I_3$) is formed by correcting image ($I_2$) using perspective transform ($T_1$) and page shape transform ($T_2$). Specifically, at step 180 each page pixel location i(x,y) is mapped from the page coordinate system to the world coordinate system using the page shape transform $T_2$ to define target pixel locations i(X,Y,Z) in world coordinates. At step 182, these target pixel locations i(X,Y,Z) in the world coordinate system are mapped to the image coordinate system using the perspective transform $T_1$ to specify image pixel locations i(u,v). Transform $T_1$ is defined by the following perspective transform:

$$\begin{bmatrix} u' \\ v' \\ z' \end{bmatrix} = T_1 \begin{bmatrix} X \\ Y \\ Z \\ 1 \end{bmatrix},$$

where: u', v', and z' represent the coordinate system of the image acquisition system 20; z' is an intermediate variable that accounts for perspective depth effects; u=u'/z'; v=v'/z'; X, Y, and Z are location of a point of a bound document in world coordinates; and u, v are the location of a point of the bound document in image coordinates. At step 184, values specified at image pixel locations i(u,v) in recorded image $I_2$ are interpolated to define values for each page pixel location i(x,y) in de-warped image ($I_3$). Interpolation is well known and can be performed using alternate schemes such as bi-linear interpolation, bi-cubic interpolation, and area mapping.

It will no doubt be appreciated that there are a number of possible manners in which to implement the various aspects of present invention. Unlike most scanning systems, the present invention is a bound document scanning system with a general imaging geometry. This aspect of the present invention provides a portable book scanning system with an imagable area that is not fixed. This facilitates movement of the bound document scanning system from one physical location to another, as well as one imagable area to another. In addition, this aspect of the invention obviates the need to upend a bound document between page turns as is required when placing the bound document in contact with a flat scanning surface. Consequently, the disclosed scanning system has a maximum scanning rate which is bounded by the rate at which the pages of a bound document can be turned and recorded.

It will also be appreciated that image data 32 and page shape data 34 can be recorded in a single original image that is later divided into two images using known image processing techniques. For example, red light can be projected by the light stripe projection system 22. Any red light can be removed from a recorded image using subtractive image processing techniques. This subtractive technique defines image data and page shape data using the single original image. It will also be appreciated that the light stripe projection system is not limited to emitting red light so long as the wavelength of ambient light can be controlled, and that for the purposes of the present invention any two wavelengths that are distinguishable will do, such as green light and blue light.

It will further be appreciated that scanning system 4 can be readily modified to incorporate functions of a system that automatically turns pages of a bound document. Examples of systems for tuning pages of bound documents are disclosed by Turner et al., in U.S. patent application Ser. No. 08/570,880 entitled "Bound Document Imager with Page Turner," and U.S. patent application Ser. No. 08/570,791 entitled "Bound Document Imager with Air Jet Page Turning System," both filed on Dec. 12, 1995 and assigned to the same assignee as the present invention. It will also be appreciated that scanning system 4 can be readily modified to include job level programming as described by Rourke et al. in U.S. Pat. No. 5,119,206. Job level programming can include programming that manages input scanning as well as output rendering. Programming options for scanning bound documents include input commands for specifying whether to scan one or both sides of a bound document. Programming options for rendering scanned images of a bound document include specifying whether opposing sides of a bound document are to be printed on a common print media sheet or on separate print media sheets.

Various aspects of the disclosed document scanning system may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized. The system, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

I claim:

1. In a scanning apparatus having an image acquisition system for recording images and a light stripe projector for projecting a light stripe, a method for determining a shape of the bound document positioned in an imaging area of the scanning apparatus, comprising the steps of:

recording, with the image acquisition system, an image of the bound document having a light stripe projected thereacross by the light stripe projector, the image being defined by an array of scan lines, with each scan line having pixels with an intensity value;

adaptively thresholding the pixels forming the image to identify pixels defining part of the light stripe, said adaptive thresholding step compensating for non-uniform illumination across the bound document recorded by the image acquisition system;

identifying a pixel starting location that forms part of the light stripe on a first scan line near a midpoint of the image;

tracking, from the pixel starting location, a first set of pixels that further define the light stripe in the image, the first set of pixels representing a trace of the light stripe projected across the bound document;

smoothing the first set of pixels to minimize large transitions between scan lines;

detecting a crease location along the first set of pixels that identifies a spine region of the bound document; and responsive to said detecting step, modifying the first set of pixels representing the trace, said modifying step replacing pixels near the crease location with a second set of pixels that are determined using a parametric model that approximates the spine region of the bound document.

2. The method according to claim 1, wherein said step of adaptively thresholding the image includes the steps of:

identifying pixels in the image with intensity values that vary in intensity from neighboring pixels by a threshold value, and setting the intensity values of those pixels in the image identified by said adaptive thresholding step to zero.

3. The method according to claim 1, wherein said step of defining a starting location includes the step of identifying a neighborhood of pixels having a non-zero intensity value.

4. The method according to claim 3, wherein said step of identifying a starting pixel location includes the steps of:

defining a neighborhood of pixels in the image; and computing a centroid of the neighborhood of pixels.

5. The method according to claim 4, further comprising the step of centering the neighborhood of pixels at a pixel location defined by the centroid.

6. The method according to claim 5, further comprising the step of repeating said computing step and said centering step until the neighborhood of pixels does not change.

7. The method according to claim 6, wherein said centroid is an average value of the intensity values in the neighborhood of pixels.

8. The method according to claim 1, wherein said tracking step tracks in a first direction and a second direction one scan line at a time.

9. The method according to claim 1, wherein said tracking step further comprises the steps of:

identifying, within a predefined area in the image, pixels a small distance from the pixel starting location on a second scan line having a non-zero intensity value; and evaluating a centroid of the identified pixels with a non-zero intensity value on the second scan line.

10. The method according to claim 9, further comprising the steps of:

growing the predefined area;

identifying, within the grown predefined area, pixels a small distance from the pixel starting location on the second scan line having a non-zero intensity value; and evaluating a centroid of the identified pixels with a non-zero intensity value on the second scan line.

11. The method according to claim 10, further comprising the step of abandoning said growing step at a predetermined maximum area.

12. The method according to claim 1, further comprising the step of transforming the set of pixels from a pixel coordinate system to a height coordinate system.

13. The method according to claim 1, wherein said smoothing step smoothes the set of pixels with a Gaussian smoothing kernel.

14. The method according to claim 1, wherein said detecting step includes the step of assessing whether the trace contains a pixel that identifies the spine region of the bound document.

15. The method according to claim 14, wherein said assessing step includes the steps of:

measuring in the image changes in height between each scan line along the trace of the light stripe projected across the bound document; and selecting a pixel identifying a maximum measured change in height, the selected pixel identifying the spine region of the bound document.

16. The method according to claim 1, wherein said modifying step includes the step of fitting a parabola to the pixels defining the trace of the light stripe in the spine region of the bound document.

17. The method according to claim 1, wherein said detecting step identifies the crease pixel at a scan line in the image.

18. The method according to claim 1, wherein said tracking step rejects pixels that are exist apart from pixels in the first set of pixels.

19. A method for scanning a sequence of non-planar original images of a bound document, comprising the steps of:

recording geometry data and raw image data for each image in the sequence of non-planar original images, said recording step including the steps of:

projecting a light stripe on a non-planar original image, acquiring geometry data with an image acquisition system, and acquiring raw image data with the image acquisition system; and correcting the recorded raw image data for each image in the sequence of non-planar original images with the recorded geometry data, said correcting step performing, for each image in the sequence of non-planar original images, the steps of:

identifying a pixel starting location that forms part of the light stripe on a scan line near a midpoint of the geometry data, tracking, from the pixel starting location, a set of pixels that further define the light stripe in the image, smoothing the set of pixels to minimize large transitions between scan lines, converting the set of pixels, which represent a trace of the light stripe projected across the bound document, to a page shape transform, and de-warping the recorded image data with the page shape transform to provide corrected image data.

20. The method according to claim 19, wherein said recording step is completed before initiating said correcting step.

21. The method according to claim 19, further comprising the step of storing the geometry data and the raw image data in a memory.

22. The method according to claim 21, wherein said correcting step is delayed until the raw image data is displayed on a terminal.

23. The method according to claim 21, wherein said correcting step is delayed until the raw image data is reproduced as hard copy.

24. The method according to claim 19, further comprising the step of recording calibration data with the image acquisition system.

25. The method according to claim 24, wherein said correcting step includes the step of determining a perspective transform with the calibration data, the perspective transform defining a relationship, between a two-dimensional coordinate system of the image acquisition system and a three-dimensional coordinate system of the bound document.

26. The method according to claim 25, wherein said de-warping step includes the step of transforming the image data with the perspective transform.

27. The method according to claim 19, wherein said recording step and said correcting step are performed in parallel for each image in the sequence of non-planar original images.

28. The method according to claim 19, wherein said recording step and said correcting step are performed sequentially for each image in the sequence of non-planar original images.

* * * * *